(12) United States Patent
Beekhuis

(10) Patent No.: US 8,029,288 B2
(45) Date of Patent: Oct. 4, 2011

(54) COMPUTER IMPLEMENTED SYSTEMS AND METHODS FOR ENHANCING RENEWABLE ENERGY EDUCATIONAL ACTIVITIES

(75) Inventor: Christiaan Willem Beekhuis, San Jose, CA (US)

(73) Assignee: Power-One, Inc., Camarillo, CA (US)

(*) Notice: Subject to any disclaimer, the term of this patent is extended or adjusted under 35 U.S.C. 154(b) by 907 days.

(21) Appl. No.: 11/918,970

(22) PCT Filed: Apr. 28, 2006

(86) PCT No.: PCT/US2006/016280
§ 371 (c)(1), (2), (4) Date: Oct. 22, 2007

(87) PCT Pub. No.: WO2006/119031
PCT Pub. Date: Nov. 9, 2006

(65) Prior Publication Data
US 2009/0043548 A1 Feb. 12, 2009

Related U.S. Application Data

(60) Provisional application No. 60/676,390, filed on Apr. 29, 2005.

(51) Int. Cl.
*G09B 23/00* (2006.01)
(52) U.S. Cl. .......................... 434/276; 700/286
(58) Field of Classification Search .................. 434/350, 434/365, 389, 276
See application file for complete search history.

(56) References Cited

U.S. PATENT DOCUMENTS

| | | | |
|---|---|---|---|
| 5,566,084 A | 10/1996 | Cmar | |
| 5,930,773 A | 7/1999 | Crooks et al. | |
| 6,169,979 B1 | 1/2001 | Johnson | |
| 6,519,730 B1 | 2/2003 | Ando et al. | |
| 6,978,931 B2 | 12/2005 | Brobeck | |
| 7,288,921 B2 * | 10/2007 | Huff et al. ........................ | 322/20 |
| 2002/0019802 A1 | 2/2002 | Malme et al. | |
| 2002/0040356 A1 * | 4/2002 | Gluck et al. .................. | 705/412 |
| 2002/0087234 A1 | 7/2002 | Lof et al. | |
| 2003/0115251 A1 | 6/2003 | Fredrickson et al. | |
| 2003/0126060 A1 | 7/2003 | Lof et al. | |
| 2004/0143428 A1 | 7/2004 | Rappaport et al. | |
| 2004/0163011 A1 | 8/2004 | Shaw | |
| 2004/0205403 A1 | 10/2004 | Markow et al. | |
| 2004/0260981 A1 | 12/2004 | Kitamorn et al. | |
| 2005/0034023 A1 * | 2/2005 | Maturana et al. ............... | 714/37 |
| 2005/0229039 A1 | 10/2005 | Anderson et al. | |

* cited by examiner

*Primary Examiner* — Xuan Thai
*Assistant Examiner* — Banafsheh Hadizonooz
(74) *Attorney, Agent, or Firm* — Waddey & Patterson; Mark J. Patterson; Gary L. Montle

(57) ABSTRACT

Systems and methods are provided for collecting, aggregating, and analyzing data associated with the performance of systems. Energy systems, specifically renewable energy generation systems, are used as examples. The aggregated data serve as the basis for a variety of services that facilitate the adoption and deployment of these systems. Services are provided that aid in enhancing energy educational activities. The services represent the quantity of energy generation as energy demands that the students may appreciate. Furthermore, the services are interactive and may allow the students to change System Parameters so that they more fully understand the influence of these parameters on the energy generation efficiency.

12 Claims, 4 Drawing Sheets

COMPUTER IMPLEMENTED SYSTEMS AND METHODS FOR ENHANCING RENEWABLE ENERGY EDUCATIONAL ACTIVITIES

FIELD OF THE INVENTION

In general, the present invention relates to computer implemented systems and methods for providing services to a network of customers, more specifically to services enabled by methods comprising the collection, aggregation, and analysis of data in a central database from a plurality of systems that are not otherwise associated with one another to provide performance metrics and most particularly to the establishment and improvement of various performance metrics related to the execution of customer activities and the initiation of specific actions related to performance in comparison with such metrics. More specifically, the present invention relates to computer implemented services enabled by systems and methods comprising the collection, aggregation, and analysis of data related to the installation and operation of renewable energy systems comprising solar energy, wind turbine energy, tidal energy, geothermal energy, and the like, or to distributed energy generation systems comprising waste-to-energy generation systems, fuel cells, microturbines, diesel generators, and the like.

BACKGROUND OF THE INVENTION

There is increased interest in the development and deployment of renewable energy systems comprising solar energy, wind turbine energy, tidal energy, geothermal energy, and the like, or to distributed energy generation systems comprising waste-to-energy generation systems, fuel cells, microturbines, diesel generators, and the like. This interest is being driven by a number of factors including a limited supply of fossil fuels, increased pollution from the acquisition and use of fossil fuels, global warming considerations, rising costs of fossil fuels, the loss of natural lands due to the construction of fossil fuel power plants, continued utility grid degradation and blackouts, unpredictable energy prices, the need for local power generation in disaster recovery situations, the need to move away from centralized power plants to distributed energy systems for homeland security, and the like. Advancements in the development of renewable energy and distributed energy generation technologies have overcome earlier impediments such as poor efficiency, installation difficulty, high cost, high maintenance, and the like and are presently offering increasingly attractive alternatives to fossil fuel power systems in the generation and delivery of electric power.

One of the issues faced by the renewable energy and distributed energy generation industries is that the adoption and deployment of such systems is often sporadic and not well coordinated. The decision to invest in and install a renewable energy or distributed energy generation system is typically made at the individual entity level rather than as a planned activity for an entire community. For economy of language, in this context, an "entity" may comprise an individual, a company, an office building, a shopping mall, a shopping center, a sports complex, or other such organization, business, or group investing collectively in a source of energy. Consequently, the renewable energy and distributed energy generation industries often lack the coordinated, integrated infrastructure that is typically common in other industries. The lack of infrastructure inhibits the adoption and installation of new renewable energy and distributed energy generation systems and does not allow these industries to gain advantages due to cooperation or economies of scale to lower costs, increase acceptance and deployment, and attract additional investment capital.

Accordingly, there is a need for further developments in methods and systems to facilitate the connection and cooperation of the wide variety of entities and individual implementations of renewable energy or distributed energy generation systems to improve efficiencies, lower costs, facilitate new services, facilitate management and improvement of the energy production and distribution system as a whole, facilitate and improve training and education, facilitate energy commerce, and the like. In particular, there is a need for improved systems and methods to improve and enhance the education activities and increase the awareness of students in the field of renewable energy.

BRIEF SUMMARY OF THE INVENTION

Advancements in the development of renewable energy and distributed energy generation systems have overcome, to a large extent, earlier impediments such as poor efficiency, installation difficulty, high cost, high maintenance, and the like. Specifically, advancements in the technology associated with the capture and conversion of solar energy into useable electricity has led to an increased adoption and deployment rate of solar energy generation systems. However, the infrastructure associated with collecting and analyzing data associated with the distribution infrastructure, system performance, system response, system efficiency, costs, savings associated with the system, and the like has not grown at the same pace as the implementation of solar energy generation systems. Systems and methods for the collection, aggregation, and analyzing of this data and providing services based on the results of the analysis have been developed as part of some embodiments of the present invention.

In some embodiments of the present invention, the data collection systems and methods cited above may use a local communications device installed at the site of the renewable energy generation or distributed energy generation system to collect data on the system comprising system ID, location, performance, calibration, ambient conditions, efficiency, temperature, wind speed, wind direction, solar irradiance, energy generation, device status flags, and the like. Typical data collection systems comprise embedded sensors, external sensors, embedded computers, and the like. Typical local communications devices comprise modems, routers, switches, embedded computers, wireless transmitters, and the like. The data may be transmitted via a wireless or hard-wired network or other communication means to a secure, central database where the data is aggregated with data from other systems and analyzed to provide value added services to the members of the renewable energy or distributed energy generation supply chain. Examples of suitable networks comprise the Internet, a Local Area Network (LAN), a Wide Area Network (WAN), a wireless network, cellular networks (e.g. GSM, GPRS, etc.), combinations thereof, and the like. Various embodiments of the present invention include security features such that proprietary or business-sensitive data is not accessible among different business entities, thereby providing all entities access to aggregated information while compromising the security of none.

Various embodiments of the present invention relate generally to systems and methods that utilize the secure, centrally collected, aggregated, and analyzed data to provide a number of beneficial services. The services may be desirable and useful to many "Supply Chain Entities" within the renewable energy or distributed energy generation system supply chain.

For economy of language, we use the term, Supply Chain Entity or Entities to refer to one or more of the "Installation Technician", the "Value Added Reseller (VAR)", the "System Integrator", the "Original Equipment Manufacturer (OEM)" component supplier, the "local energy utility", various local government agencies, the Project Financier or Investor, the Distributed Utility provider, among others. These labels have been used for convenience in the context of the present teaching. It will be clear to those skilled in the art that those entities or parties that provide similar functions and services within the supply chain may use a wide variety of names and labels. These labels do not limit the scope of the present invention in any way.

In some embodiments of the present invention, the aggregated data may be used to offer services to enhance the effectiveness of teaching and educational activities. Data may be collected, aggregated, and analyzed across the database and may be used to correlate energy generation effectiveness with System Parameters such as installation region, system orientation, system tilt angle, system tracking features, system tracking capabilities, expected shading, date, ambient temperature, solar irradiance, weather conditions, and the like. The services may represent the quantity of energy generation as an equivalent energy demand that the students may appreciate such as "brewing a number of cups of coffee", "cooking a number of cups of rice", "energy for a number of households", "hours of playing a video game", "energy contained in a number of sticks of dynamite", and the like. The services may also represent the quantity of energy generation as an equivalent reduction in pollution that would have been generated by the typical consumption of fossil fuels that the students may appreciate such as "tons of gases such as $CO_2$, $NO_x$, and $SO_x$ not generated", "tons of coal not burned", and the like. The services may also represent the quantity of energy generation as additional benefits such as "number of power plants that did not have to be built to cover periods of peak energy demand", "acres of land saved from power plant construction", and the like. Finally, the services may allow the students to interactively select the geographic region near their houses to determine the energy generation opportunity in their neighborhood based on data from the central database. The services may also allow the students to interactively change the System Parameters such as date, system orientation, system tilt angle, shading, ambient temperature, solar irradiance, weather conditions, and the like to more fully appreciate how these factors influence the quantity of energy generation.

The methods of some embodiments of the present invention may be implemented on a plurality of systems. The systems may comprise one or more energy systems, sensors contained within the energy systems to monitor various settings and performance attributes of the energy systems, sensors associated with the energy systems to measure various environmental conditions, a communications device for managing two-way communications between the sensors, the energy systems, and a network, a network for transmitting the data to a centralized database, a centralized database for receiving and storing data from a plurality of systems, user interfaces for interacting with the centralized database, procedures for acting upon the data, and a plurality of output means for displaying the results of the procedure treatments.

BRIEF DESCRIPTION OF THE DRAWINGS

Other aspects, embodiments and advantages of the invention may become apparent upon reading of the detailed description of the invention and the appended claims provided below, and upon reference to the drawings in which:

DETAILED DESCRIPTION OF THE INVENTION

In general, various embodiments of the present invention relate to systems and methods that utilize secure, centrally collected, aggregated, and analyzed data to provide a number of beneficial services. The services may be desirable and useful to many Supply Chain Entities within the renewable energy or distributed energy generation system supply chain.

Figure 1:
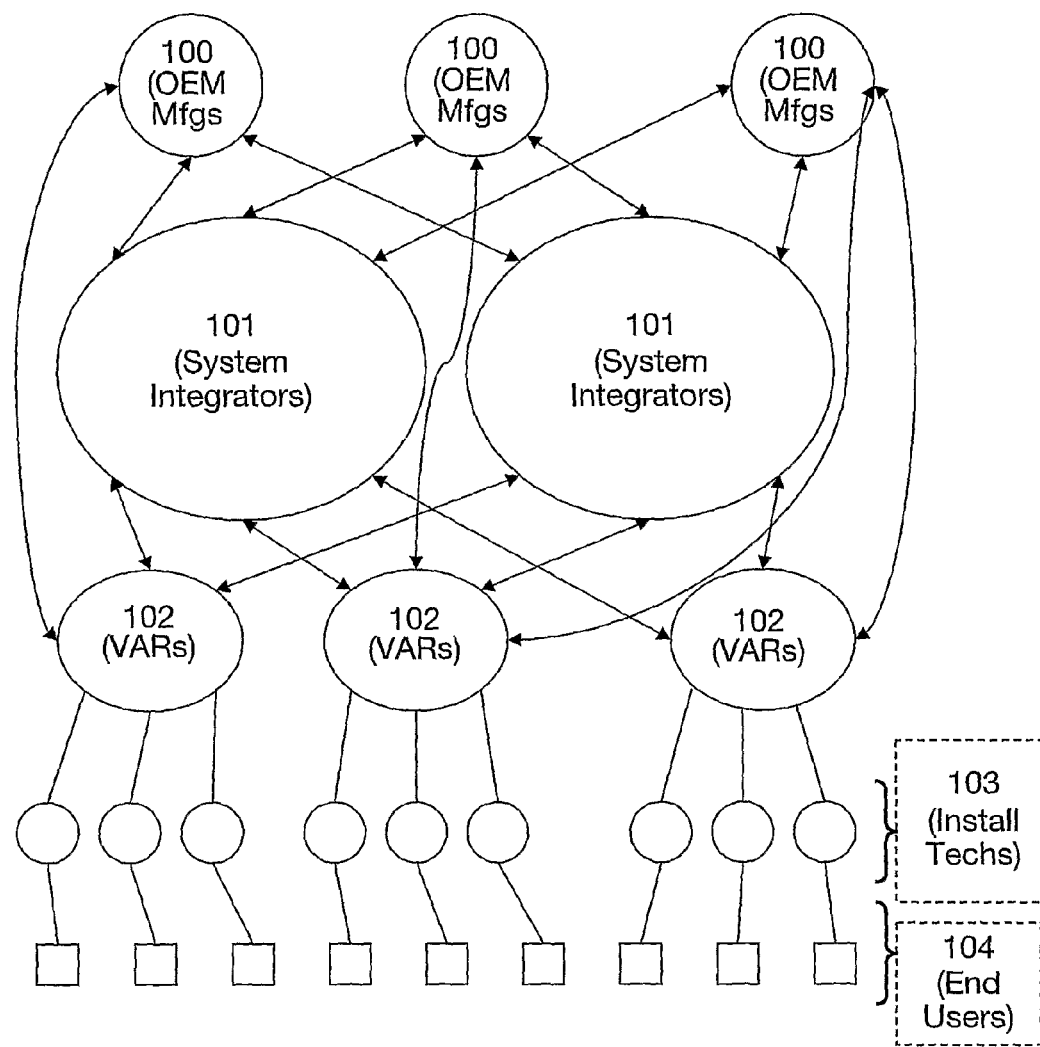
FIG. 1 is a schematic representation of a portion of a typical renewable energy or distributed energy generation system supply chain.

In some embodiments of the present invention, the systems and methods provide services to the various instructors in the renewable energy or distributed energy generation system education field. As an illustration, consider the supply chain structure illustrated in FIG. 1 wherein, large national Systems Integrators, 101, market and sell the renewable energy or distributed energy generation systems to End Users, 104. Typically, the System Integrators may design and oversee the installation and commissioning of the renewable energy or distributed energy generation systems. The System Integrators may contract with VARs, 102, who are local to the End Users and who may perform services comprising installation, service, upgrades, retrofits, and the like on behalf of the System Integrators. Furthermore, the VARs may employ a plurality of Installation Technicians, 103, who may perform services comprising installation, service, upgrades, retrofits, and the like on behalf of the VARs. OEM component suppliers, 100, may supply components to the System Integrators, 101, or the VARs, 102. At each point along this supply chain there are opportunities to educate the customer or the general public. It may be advantageous if the educational experience can include an interactive experience based on real time data. These labels have been used for convenience in the context of the present teaching. It will be clear to those skilled in the art that those entities or parties that provide similar functions and services within the supply chain may use a wide variety of names and labels. These labels do not limit the scope of the present invention in any way.

In an exemplary embodiment of the present invention, the systems and methods may be applied to a solar energy generation system. However, the solar energy example does not limit the scope of the present invention in any way. The systems and methods described herein may be applied to any general system. Specifically, the systems and methods described herein may be applied to any general energy system such as an energy consumption system, an energy generation system, an energy storage system, combinations thereof, and the like. More specifically, the systems and methods described herein may be applied to any renewable energy generation comprising solar energy, wind turbine energy, tidal energy, geothermal energy, and the like, or distributed energy generation technology comprising waste-to-energy generation technologies, fuel cells, microturbines, diesel generators, and the like or any combination thereof. In the context of the present teaching, a system comprising more than one type of system as listed above will be designated a "hybrid" system.

Typically, the solar energy system may be installed by an Installation Technician following an established installation checklist. The system may be connected to a central database via a network. Examples of suitable networks comprise the Internet, a Local Area Network (LAN), a Wide Area Network (WAN), a wireless network, cellular networks (e.g. GSM, GPRS, etc.), combinations thereof, and the like. In this exemplary embodiment, System Identification Data are collected at the point of sale by the System Integrator or the VAR, said System Identification Data comprising, End User identification, system warranty information, system performance guarantee commitment information, expected system power output, and the like. The System Identification Data are static in time meaning that they may not generally change once established. The System Identification Data may be entered into the central database and serve as a unique identifier for the system. System Configuration Data are collected during the manufacture and testing of the system, said System Configuration Data comprising, system configuration with OEM component identification, system wiring details, system tracking features, system tracking capabilities and the like. The System Configuration Data are generally static in time meaning that they may not generally change once established. However, the System Configuration Data may change during periods of service, upgrades, or enhancements to the system. The System Configuration Data may be entered into the central database and associated with the unique System Identification Data previously entered. System Installation Data are collected at the time of installation, said System Installation Data comprising, VAR identity, Installation Technician identity, installation region, system orientation, system tilt angle, expected shading, time to complete the system installation, number of errors during the system installation, an End User satisfaction index (EUSI), firmware revision, system parameter settings, and the like. In the context of the present teaching, "expected shading" may be associated with the area and time that the system is covered by shadows due to neighboring trees, building, structures, etc. It may be expressed in units of % coverage per hour for each time period of interest comprising months, seasons, years, billing periods, and the like. This quantity may be useful in estimating the performance of the system. The System Installation Data are static in time meaning that they may not generally change once established. The System Installation Data may be entered into the central database and associated with the unique System Identification Data previously entered. System Performance Data and ambient condition data are collected and continuously at a predefined interval after start-up of the system, said System Performance Data comprising, system response, system performance, ambient temperature, solar irradiance, conversion efficiency, current tilt angle, system energy output, current firmware revision, current system parameter settings, device fault and error codes, power, voltage, cumulative energy generated, and the like. The System Performance Data change with time and are entered into the central database as a time series with associated date and time stamps. The temporal System Performance Data are associated with the unique System Identification Data previously entered. The data correlated to the installation region may be aggregated to several levels of granularity, said levels comprising country, time zone, state or province, county, postal code, Global Positioning System (GPS) coordinates, and the like. Additionally, System History Data may be associated with each unique System Identification Data record. The System History Data captures changes in the System Configuration Data over time. Examples of System History Data comprise time-to-first-service-call, details of the service calls, steps taken to resolve the issues in the service calls, upgrades to the system configuration, new firmware revisions, new parameter settings, and the like. Entries in the System History Data typically contain date and time stamps so that changes may be tracked over the life of the system.

In some embodiments of the present invention, the systems and methods may be applied to a solar energy generation system as an example. The aggregated data may be used to offer services to enhance the effectiveness of teaching and educational activities. In the context of the present teaching, the term "students" may be understood to comprise students, customers, the general public, government officials, and the like. A plurality of energy generation systems may be connected to a central database via a network. Examples of suitable networks comprise the Internet, a Local Area Network (LAN), a Wide Area Network (WAN), a wireless network, cellular networks (e.g. GSM, GPRS, etc.), combinations thereof, and the like. System Performance and energy generation data may be collected, aggregated, and analyzed by procedures within the database. Services may correlate the quantity of energy generation effectiveness with System Parameters such as installation region, typical weather patterns, system orientation, system tilt angle, system tracking features, system tracking capabilities, expected shading, typical cloud cover, weather conditions, and the like. The services may represent the quantity of energy generation as an equivalent energy demand that the students may appreciate such as "brewing a number of cups of coffee", "cooking a number of cups of rice", "energy for a number of households", "hours of playing a video game", "energy contained in a number of sticks of dynamite", and the like. The services may also represent the quantity of energy generation as an equivalent reduction in pollution that would have been generated by the typical consumption of fossil fuels that the students may appreciate such as "tons of gases such as $CO_2$, $NO_x$, and $SO_x$ not generated", "tons of coal not burned", and the like. The services may also represent the quantity of energy generation as additional benefits such as "number of power plants that did not have to be built to cover periods of peak energy demand", "acres of land saved from power plant construction", and the like. Finally, the services may allow the students to interactively select the geographic region near their houses to determine the energy generation opportunity in their neighborhood based on data from the central database. The services may also allow the students to interactively change the System Parameters such as date, installation region, typical weather patterns, system orientation, system tilt angle, system tracking features, system tracking capabilities, expected shading, typical cloud cover, weather conditions, and the like to more fully appreciate how these factors influence the energy generation.

Figure 2:
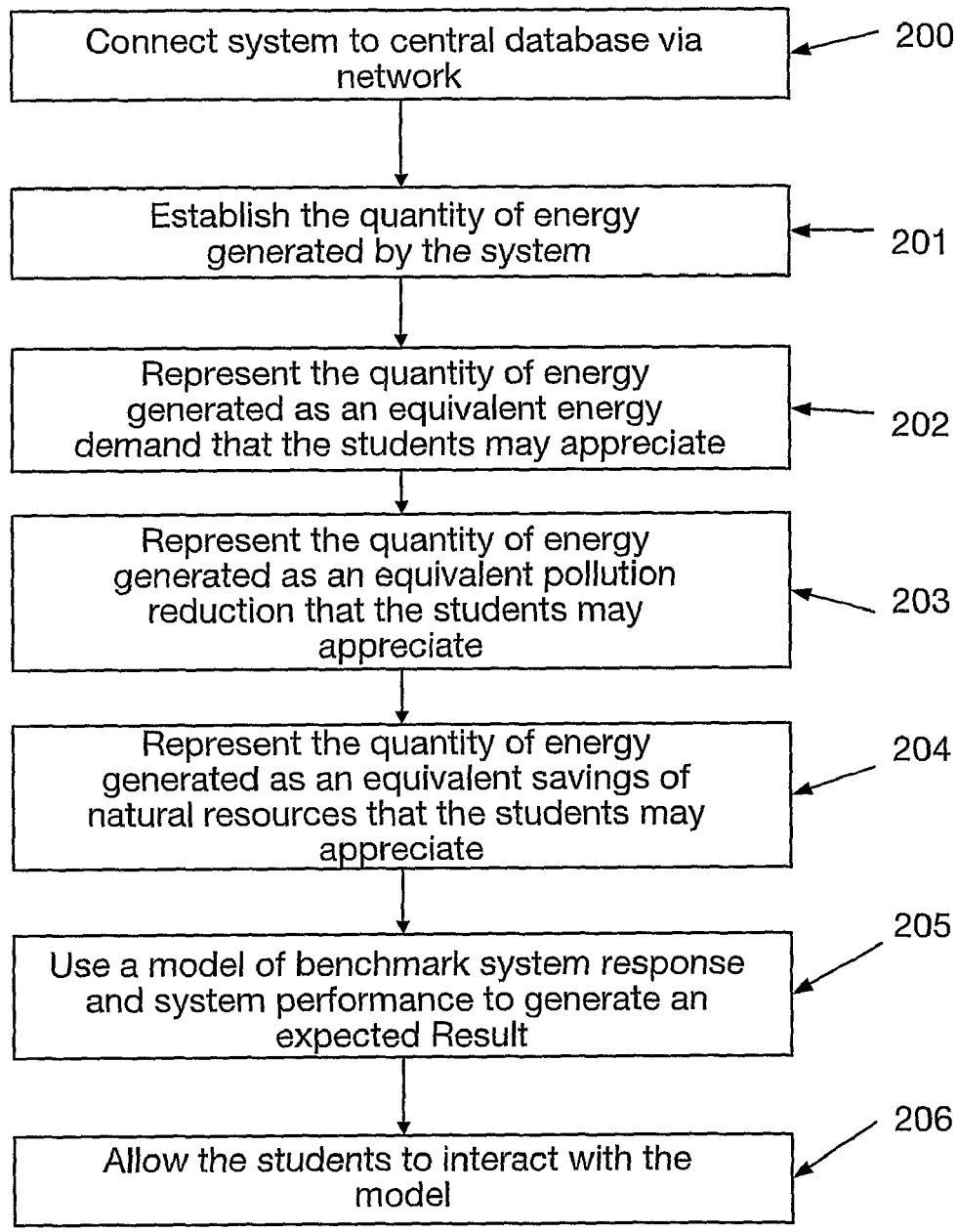
FIG. 2 is a flow chart of steps in some embodiments of the present invention.

In some embodiments of the present invention, the methods and procedures for connecting a system to a central database via a network, establishing the quantity of energy generated by the system, representing the quantity of generated energy as an equivalent energy demand that the students may appreciate, representing the quantity of generated energy as an equivalent reduction in pollution that the students may appreciate, representing the quantity of generated energy as an equivalent savings of natural resources that the students may appreciate, using a model of benchmark system response and system performance to generate an expected result of system performance, and allowing the students to interact with the model may follow the steps, 200-206, as outlined in FIG. 2. These exemplary steps are not meant to limit the scope of the present invention.

Through the services provided, the data may be manipulated and parsed by the various students subject to various security measures as discussed below. A plurality of standard procedures exists to aid in the manipulation of the data. Examples of suitable procedures comprise methods for calculating typical statistical values such as mean, median, average, standard deviation, maximum value, minimum value, variance, and the like. These procedures are listed as illustrations only and do not limit the scope of the present invention in any way. Alternatively, the students may develop and generate a custom procedure to extract and manipulate the data for their specific purpose.

The systems and methods may include a number of security measures to protect the intellectual property and confidential information for the various Supply Chain Entities of the renewable energy system supply chain. The security measures comprise software passwords, tokens, smart cards, biometric identification means, and the like. The security measures ensure that the students do not have access to specific system data, but rather a representation of similar system data. However, the students may request results based on the analysis of the aggregated data across the database so that they may compare their data to the larger population of systems.

Figure 3:
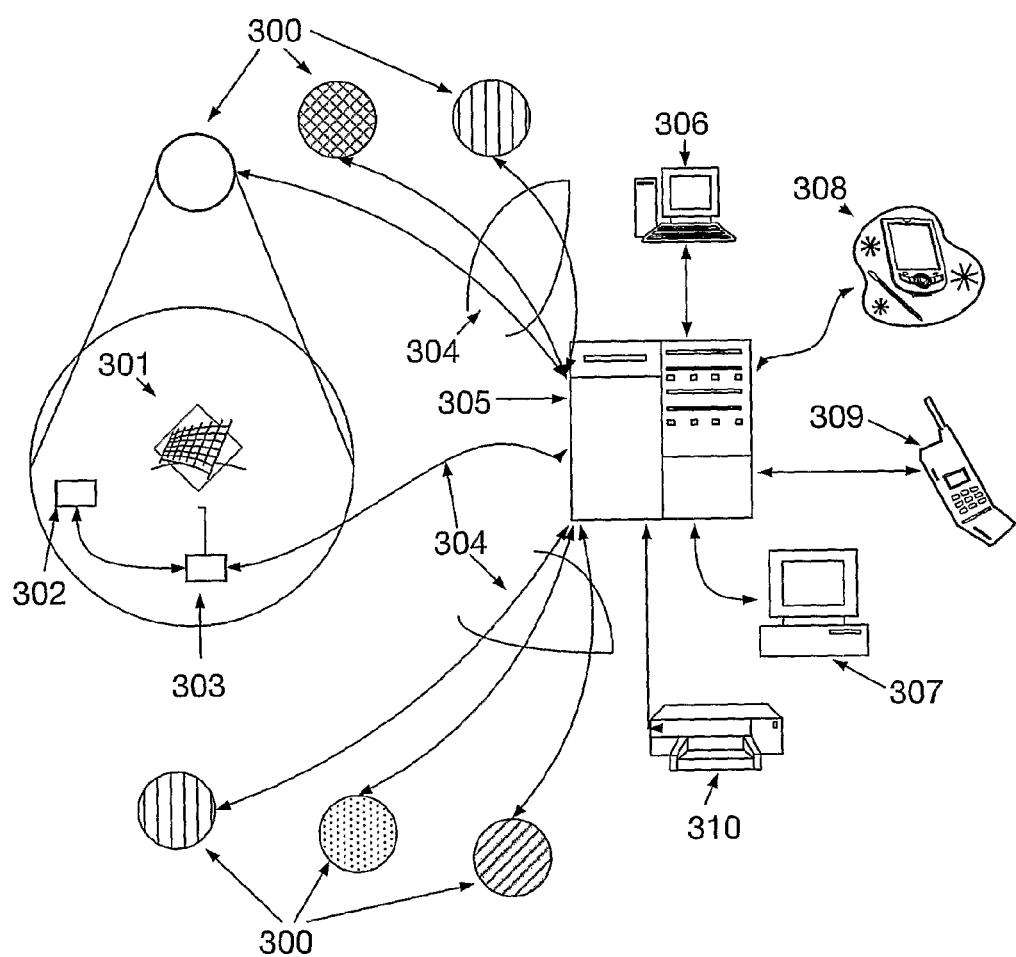
FIG. 3 is a schematic representation of a system pertaining to some embodiments of the present invention.

The database may contain data from systems installed worldwide by a large number of Supply Chain Entities. The different pattern fill of the circles representing systems, 300, illustrated in FIG. 3 is meant to convey that these systems are associated with different Supply Chain Entities. Comparisons and analyses may be completed by aggregating data from systems with similar features comprising System Integrator ID, VAR ID, Installation Technician ID, expected system power output, system configuration with OEM component identification, system wiring details, system tracking features, system tracking capabilities, expected shading, installation region, system orientation, system tilt angle, firmware revision, system parameter settings, system response, system performance, ambient temperature, solar irradiance, conversion efficiency, current tilt angle, system energy output, device fault and error codes, power, voltage, cumulative energy generated, and the like. Advantageously, the database enables students to compare detailed data across systems under their school's responsibility or to compare their data to benchmark or aggregated data across the entire database. For example, a student may compare detailed data for systems installed across his own region of his state, province, or country. Alternatively, the same student may compare data for one or more of his region's systems with benchmark or aggregated data for systems installed in a completely different region such as Europe.

Referring now to FIG. 3, the methods of some embodiments of the present invention may be implemented on a plurality of systems. The systems may comprise one or more energy systems, 300, sensors contained within the energy system to monitor various settings and performance attributes of the energy system, sensors associated with the energy system to measure various environmental conditions, 302, a local communications device for managing two-way communications between the sensors, the energy systems, and a network, 303, a network for transmitting the data to a centralized database, 304, a centralized database for receiving and storing data from the plurality of systems, 305, user interfaces for interacting with the centralized database, 306-309, procedures for acting upon the data, and a plurality of output devices for displaying the results of the procedure action, 306-310.

Continuing to refer to FIG. 3, in some exemplary embodiments comprising solar energy generation systems, the sensors contained within the system may monitor various settings and performance attributes comprising, system response, system performance, conversion efficiency, current tilt angle, expected shading, system energy output, current firmware revision, current system parameter settings, device fault and error codes, power, voltage, cumulative energy generated, and the like. Sensors associated with the system, 302, may measure various environmental conditions comprising ambient temperature, solar irradiance, and the like. The data may be communicated onto a network, 304, by a local communications device, 303. Examples of suitable networks comprise the Internet, a Local Area Network (LAN), a Wide Area Network (WAN), a wireless network, cellular networks (e.g. GSM, GPRS, etc.), combinations thereof, and the like. The data may be received and stored on a centralized database, 305. The data in the centralized database may be accessed by a plurality of user interfaces comprising computer terminals, 307, personal computers (PCs), 306, personal digital assistants (PDAs), 308, cellular phones, 309, interactive displays, and the like. This allows the user to be located remotely from the centralized database. As mentioned previously, the centralized database contains a variety of security features to prevent sensitive detailed data from being viewed or accessed by users without the proper security clearance. Procedures may be used to act on the data to generate results of various inquires. The procedures may be part of a standard set of calculations or may be developed and generated by the user. The results of the action by the procedures may be displayed to the user on a number of output means. Examples of suitable output means comprise computer terminals, 307, personal computers (PCs), 306, printers, 310, LED displays, personal digital assistants (PDAs), 308, cellular phones, 309, interactive displays, and the like.

Figure 4:
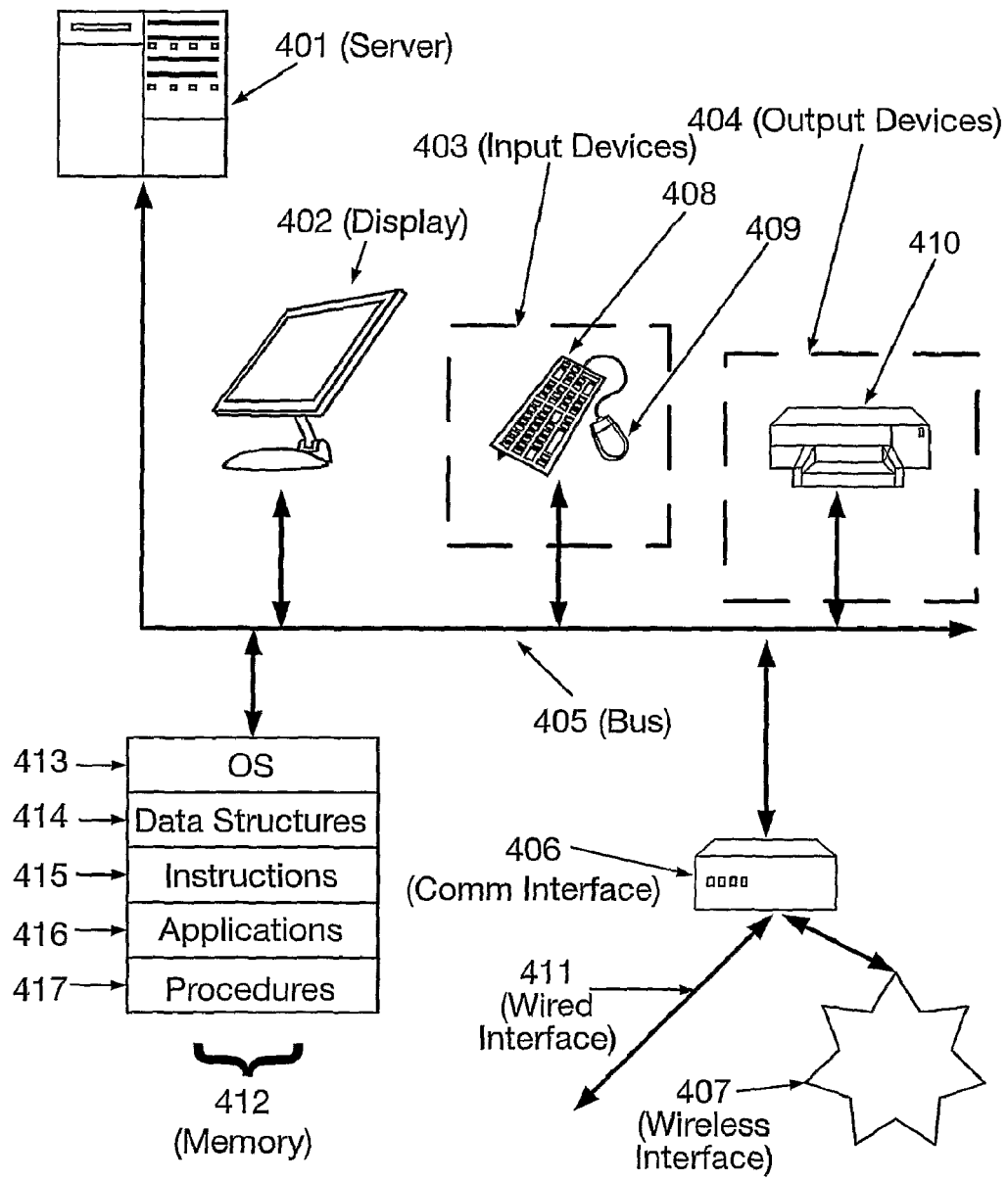
FIG. 4 depicts an illustrative computer system pertaining to various embodiments of the present invention.

FIG. 4 depicts an illustrative computer system pertaining to various embodiments of the present invention. In some embodiments, the computer system comprises a server 401, display, 402, one or more input interfaces, 403, communications interface, 406, and one or more output interfaces, 404, all conventionally coupled by one or more buses, 405. The server, 401, comprises one or more processors (not shown) and one or more memory modules, 412. The input interfaces, 403, may comprise a keyboard, 408, and a mouse, 409. The output interface, 404, may comprise a printer, 410. The communications interface, 406, is a network interface that allows the computer system to communicate via a wireless or hardwired network, 407, as previously described. The communications interface, 407, may be coupled to a transmission medium, 411, such as a network transmission line, for example, twisted pair, coaxial cable, fiber optic cable, and the like. In another embodiment, the communications interface, 411, provides a wireless interface, that is, the communication interface, 411 uses a wireless transmission medium. Examples of other devices that may be used to access the computer system via communications interface, 406, comprise cell phones, PDAs, personal computers, and the like (not shown).

The memory modules, 412, generally comprises different modalities, illustratively semiconductor memory, such as random access memory (RAM), and disk drives as well as others. In various embodiments, the memory modules, 412, store an operating system, 413, collected and aggregated data, 414, instructions, 415, applications, 416, and procedures, 417.

In various embodiments, the specific software instructions, data structures and data that implement various embodiments of the present invention are typically incorporated in the server, 401. Generally, an embodiment of the present invention is tangibly embodied in a computer readable medium, for example, the memory and is comprised of instructions, applications, and procedures which, when executed by the processor, causes the computer system to utilize the present invention, for example, the collection, aggregation, and analysis of data, converting energy generation to equivalent quantities that may be appreciated by the students, displaying the results of the analyses, and the like. The memory may store the software instructions, data structures, and data for any of the operating system, the data collection application, the data aggregation application, the data analysis procedures, and the like in semiconductor memory, in disk memory, or a combination thereof.

The operating system may be implemented by any conventional operating system comprising Windows® (Registered trademark of Microsoft Corporation), Unix® (Registered trademark of the Open Group in the United States and other countries), Mac OS® (Registered trademark of Apple Computer, Inc.), Linux® (Registered trademark of Linus Torvalds), as well as others not explicitly listed herein.

In various embodiments, the present invention may be implemented as a method, system, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 4 is not intended to limit the present invention. Other alternative hardware environments may be used without departing from the scope of the present invention.

The foregoing descriptions of exemplary embodiments of the present invention have been presented for the purpose of illustration and description. They are not intended to be exhaustive or to limit the present invention to the precise forms disclosed, and obviously many modifications, embodiments, and variations are possible in light of the above teaching.

What is claimed is:

1. A computer implemented method for enhancing energy educational activities, comprising:
    connecting an installed System to a central database via a network;
    collecting data transmitted from the System to the central database via the network in real time;
    establishing an actual quantity of energy generated by said System based on the collected data in real time and associated with one or more actual System Parameters;
    displaying via one or more output devices said actual quantity of energy generation as represented by one or more of an equivalent energy demand an equivalent reduction in pollution that would have been otherwise generated by a typical consumption of fossil fuels, and an equivalent savings of natural resources;
    receiving at the central database one or more changed System Parameters via a user interface;
    establishing an interactive quantity of energy generated by said System based on the changed System Parameters;
    displaying via the one or more output devices said interactive quantity of energy generation as represented by one or more of an equivalent energy demand, and equivalent reduction in pollution that would have otherwise been generated by a typical consumption of fossil fuels, and an equivalent savings of natural resources.

2. The method of claim 1 wherein said System comprises an energy usage system and energy storage system, an energy management system, or an energy generation system.

3. The method of claim 2 wherein said energy generation system comprises a renewable energy generation system.

4. The method of claim 3 wherein said renewable energy generation system comprises a solar energy generation system, a wind turbine energy generation system, a tidal energy generation system, a geothermal energy generation system, or a waste-to-energy system.

5. A system for enhancing energy educational activities, comprising:
    one or more Energy Systems
    sensors coupled to said Energy Systems and functional to monitor settings and performance attributes data associated with said Energy Systems;
    sensors coupled to said Energy Systems and functional to measure environmental conditions data;
    a local communications device functional to communicate said Energy Systems settings and performance attributes data and said environmental conditions data onto a network;
    a centralized database coupled to said network and effective to receive and store said Energy Systems settings and performance attributes data and said environmental conditions data communicated from said local communications device;
    a model of said Energy System performance based on said Energy Systems settings and performance attributes data;
    a user interface effective to facilitate remote access to and interaction with said centralized database;
    a computer readable medium containing procedures for acting upon said Energy Systems settings and performance attributes data and said environmental conditions data, said procedure actions comprising
        establishing a quantity of energy generated by the Energy Systems,
        displaying the quantity of energy generation as represented by an equivalent reduction in pollution,
        displaying the quantity of energy generation as represented by an equivalent reduction in pollution that would otherwise have generated by typical consumption of fossil fuels,
        displaying the quantity of energy generation as represented by an equivalent savings of natural resources,
        receiving changes to one or more said Energy Systems settings and performance attributes data and said environmental conditions data provided by remote users of the system via a user interface, and
        making changes to said model of Energy System performance based on the received changes to said one or more said Energy Systems settings and performance attributes data and said environmental conditions data; and
    display output devices effective to display the results of said procedure action.

6. The system of claim 5 wherein said one or more Energy Systems comprise at least one Energy System selected from the group consisting of an energy usage system, an energy storage system, and energy management system, and an energy generation system.

7. The system of claim 6 wherein said energy generation system comprises a renewable energy generation system.

8. The system of claim 6 wherein said energy generation system comprises a renewable energy generation system.

9. A method of using a computer to provide energy educational activities comprising the steps of
   connecting an installed energy System to a central database via a network;
   collecting real-time data transmitted from the energy System to the central database via the network;
   aggregating the collected data and data from one or more systems that are not otherwise associated with each other in the central database in association with one or more eSystem Parameters;
   establishing an actual quantity of energy generated by said energy System based on the collected real-time data;
   displaying via one or more output devices said actual quantity of energy generation as represented by one or more of an equivalent energy demand, an equivalent reduction in pollution that would have been otherwise generated by a typical consumption of fossil fuels, and an equivalent savings of natural resources;
   establishing benchmark data based on the aggregated data in the central database;
   receiving at the central database requests to display real-time data associated with the installed energy System alongside one or more of aggregated data from one or more other systems having similar System Parameters, said established benchmark data, and aggregated data across the entire central database; and
   displaying via the one or more output devices results of said requested comparison.

10. The method of claim 9 wherein said energy System comprises an energy usage system and energy storage system, an energy management system, or an energy generation system.

11. The method of claim 10 wherein said energy generation system comprises a renewable energy generation system.

12. The method of claim 11 wherein said renewable energy generation system comprises a solar energy generation system, a wind turbine energy generation system, a tidal energy generation system, a geothermal energy generation system, or a waste-to-energy system.

* * * * *